United States Patent [19]

Scire

[11] 4,114,409
[45] Sep. 19, 1978

[54] LOCK ASSEMBLY FOR BICYCLE WHEEL QUICK RELEASE MECHANISM

[76] Inventor: Joseph S. Scire, 526 Beacon St., Boston, Mass. 02215

[21] Appl. No.: 791,486

[22] Filed: Apr. 27, 1977

[51] Int. Cl.² .............................................. B62H 5/00
[52] U.S. Cl. ........................................ 70/225; 70/230; 70/233
[58] Field of Search ................. 70/225, 233, 181, 185, 70/259, 230; 280/288, 279, 289 L; 301/111

[56] References Cited

U.S. PATENT DOCUMENTS

| | | | |
|---|---|---|---|
| 1,262,185 | 4/1918 | Drew | 70/181 X |
| 1,525,993 | 2/1925 | Hurd | 70/181 |
| 1,921,434 | 8/1933 | Stone | 70/230 X |
| 1,991,208 | 2/1935 | Hawkins | 70/259 |
| 2,629,246 | 2/1953 | Schumann | 70/181 |
| 3,807,204 | 4/1974 | Cucheran | 70/259 X |
| 3,844,146 | 10/1974 | Feuces et al. | 70/227 |
| 3,953,992 | 5/1976 | Teppel | 70/227 |
| 3,965,709 | 6/1976 | Belke | 70/227 |
| 3,988,910 | 11/1976 | Widen | 70/227 |
| 4,028,915 | 6/1977 | Stahl | 70/233 |

*Primary Examiner*—Rodney H. Bonck

[57] ABSTRACT

A lock assembly for a bicycle quick release mechanism comprises: a shaft member having a threaded bore at one end, for connection to the threaded end of the actuating shaft of the quick release mechanism, and spaced from the shaft member one end a transverse bore providing a shoulder facing the actuating shaft; and a housing adapted for connection to the bicycle wheel fork, the housing having a bore for receiving the shaft member and transverse bore therein and the housing having a lock pin adapted for reciprocation to engage the shoulder in one position and a lock adapted to lock the pin in the shoulder engaging position; whereby the wheel cannot be removed from the bicycle, even with the quick release mechanism in a released position, until the lock assembly is unlocked.

5 Claims, 3 Drawing Figures

U.S. Patent  Sept. 19, 1978  4,114,409
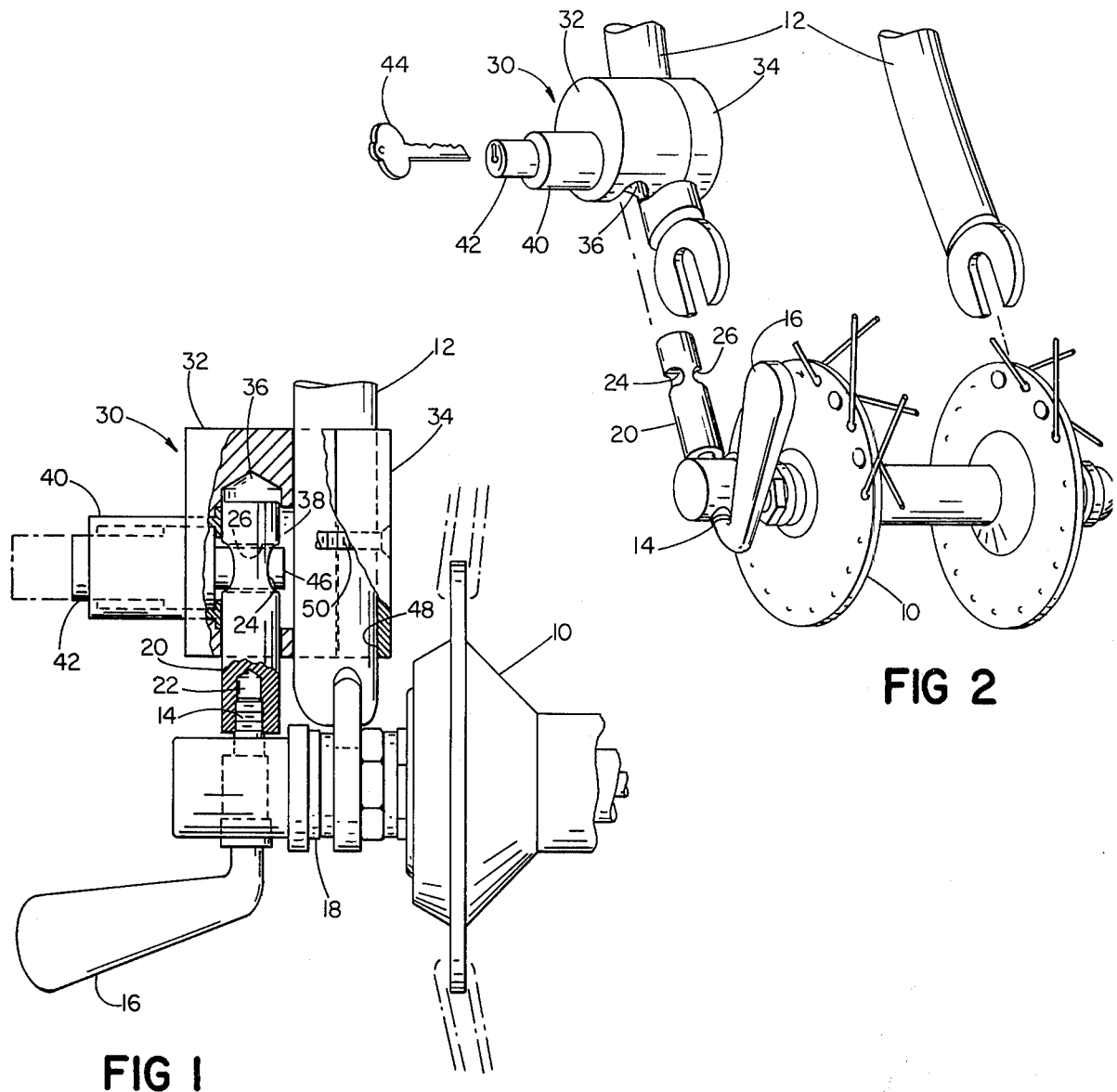
FIG 1
FIG 2
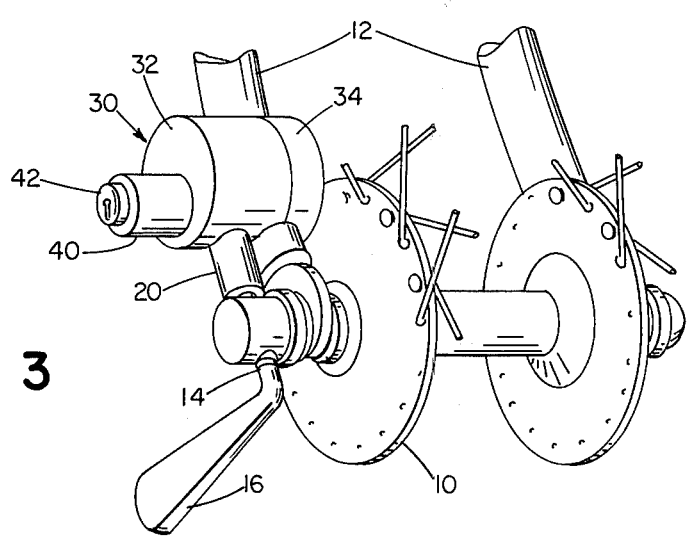
FIG 3

LOCK ASSEMBLY FOR BICYCLE WHEEL QUICK RELEASE MECHANISM

This invention relates to bicycle quick release mechanisms and more particularly to a lock assembly for a quick release mechanism to prevent wheel removal and theft.

Many bicycles have quick release mechanisms on the wheels which allow the wheel to be removed quickly and easily without the use of any tools. It is necessary, therefore, to secure the wheels of the bicycle that have such quick release mechanisms, as well as the frame of the bicycle, to prevent theft when the bicycle is left unattended.

Cables or chains with combination or key locks can be fairly easily cut with tools commonly available to bicycle thieves and are therefore not sufficiently secure for many purposes. High security bicycle locks are generally made of a very strong, but expensive material which makes it difficult, if not impossible to quickly snap, cut, or torch to gain access to the bicycle. The cost of this material as well as the awkwardness and inconvenience to the rider of having a significantly larger shackle, eliminate the possiblity of encompassing the frame and both wheels of the bicycle with such a lock. When using a high security lock, one must remove one of the wheels (usually the front wheel) to be locked with the other wheel and the bicycle frame to a permanent object to insure proper security. Otherwise, a second lock is necessary. It is a considerable inconvenience to follow such a procedure each time the bicycle is left unattended.

It is a principal object of this invention to provide a lock assembly which locks the wheel to the bicycle without interference with the quick release mechanism or with the operation of the bicycle and which does not require locking or unlocking each time the bicycle is used. A further object of the invention is to provide a lock assembly which requires no modification to the bicycle and which can be permanantly attached to the bicycle. Further objects are to provide a lock assembly which is small, light, easy to install and simple to manufacture.

In general, the invention features a lock assembly comprising a shaft extension adapted for connection at one end to the actuating shaft of a quick release mechanism and having a shoulder spaced from and facing the one end of the extension. The lock assembly also comprises a housing adapted for connection to the bicycle wheel fork and for receiving the shoulder of the shaft extension. The housing includes a lock pin selectively moveable to engage and disengage the shoulder and a lock connected to the pin adapted to lock the pin in a shoulder engaging position.

In preferred embodiments, the housing comprises a bore to receive the shaft extension. The shaft extension comprises a shaft member having a transverse bore defining the shoulder. The lock pin and lock are reciprocable together to move the lock pin into and out of the shaft extension receiving bore of the housing and the transverse bore of the shaft extension. The housing comprises two parts, the first part having the shaft extension receiving bore, the lock pin and the lock mounted therein. The second housing part is adapted for connection to the first part, a through bore provided between the first and second parts for receiving the bicycle wheel fork therein. The shaft extension comprises a threaded bore at the one end thereof for connection to the threaded end of the actuating shaft of the quick release mechanism.

Other objects, features and advantages of this invention will be apparent to those skilled in the art from the following detailed description of a preferred embodiment taken together with the accompanying drawings in which:

FIG. 1 is an elevation, partly in section, of a lock assembly mounted on a bicycle wheel fork and connected in locking engagement to a quick release mechanism;

FIG. 2 is a somewhat diagramatic isometric view illustrating the unlocked assembly with the wheel disassembled from the bicycle wheel fork; and FIG. 3 is a view similar to FIG. 2 with the wheel assembled to the wheel fork and with the lock assembly locked.

The lock assembly mounted to a bicycle frame and wheel quick release mechanism is illustrated in detail in FIG. 1. The bicycle wheel 10 is mounted to the wheel fork 12 of the bicycle in conventional manner. The wheel 10 includes a quick release mechanism including an actuating shaft 14 extending transversely through the mechanism. Lever 16, integral with shaft 14, is used to turn the shaft in one direction or the other for releasing or securing the wheel to the fork 12. The upper end of shaft 14, extending through the quick release mechanism, is threaded.

The lock assembly, which is the subject of this invention, comprises a shaft extension member 20 and a housing 30. Shaft extension 20 comprises a cylindrical shaft having a threaded bore 22 at one end for threaded connection to actuating shaft 14. Spaced from the end in which bore 22 is located, a transverse bore 24 extends through the shaft extension 20 defining a shoulder surface 26 facing bore 22.

The lock assembly housing 30 comprises two parts 32, 34. The first housing part 32 includes a bore 36 for receiving shaft extension 20. A transverse bore 38 within and extending through the first housing part 32 is stepped to receive and retain within the housing a lock 40 which is press fitted within bore 38 and which extends outwardly through the housing. Lock 40 includes a reciprocable portion 42 which locks when fully depressed and which is unlocked by a key 44 (FIG. 2). Such locks are commercially available, an example being locks of the type sold as sliding door locks. Connected to and reciprocable with the lock portion 42 is a lock pin 46 which extends into the shaft extension receiving bore 36 and into the shaft extension transverse bore 24 when the lock portion is depressed and locked. When the lock portion 42 is released, an internal spring (not shown), moves the lock portion outwardly carrying lock pin 46 out of bores 24, 36.

The second housing part 34 comprises a cover enclosing the first housing part 32. A through bore 48 is provided between housing parts 32, 34 for receiving wheel fork 12 to mount housing 30 thereon. Threaded fasteners 50 join the housing parts 32, 34.

In preferred embodiments, the threads provided in the bore 22 are selected to provide a loose fit with the threads of actuating shaft 14 thus permitting shaft 14 to turn 180° while the lock assembly is in a locked condition without undue strain on the shaft 14 and with minimal, if any, damage to the threads. Thus, where the threaded portion of shaft 14 has a diamter of 3/16" and, e.g., a 5×1 metric thread, bore 22 may be provided with a standard 10-24 thread. In preferred embodiments also, transverse bore 24 in shaft extension number 20 is larger than lock pin 46 to minimize difficulty of alignment with the lock pin. Vertical enlargement of the bore 22 also allows vertical movement of the shaft extension on rotation of actuating shaft 14 minimizing the chance of damage to the shaft or the threads of the shaft or the shaft extension upon rotation of shaft 14 while the lock assembly is locked. Fasteners 50 are preferably one-way screws to prevent their removal. In use, with wheel 10 removed from fork 12, the housing first part 32, unlocked, is placed over wheel fork 12. The second housing part 34 is then mounted on the first part 32, embracing fork 12, and fasteners 50 are partially tightened. The shaft extension member 20 is then threaded and finger tightened on actuating shaft 14 and wheel 10 is mounted on fork 12 with extension 20 in bore 36. Lock 42 is then depressed and locked with pin 46 in shaft extension transverse bore 24. If necessary for alignment of shaft extension 20 and extension receiving bore 36 with through bore 48 against fork 12, spacer washers 18 may be placed between the end of the fork and the quick release mechanism. Fasteners 50 are then tightened completely, housing 30 being manually adjusted to vertically center pin 46 in transverse bore 24.

After mounting the assembly, the wheel may be used as illustrated in FIGS. 2 and 3. With lock 40 unlocked and actuating shaft 14 turned to a release position, as in FIG. 2, the wheel may be removed or mounted conventionally with all the advantages of the quick release mechanism. When mounting the wheel, shaft extension 20 is inserted in housing bore 36 and lock 42 depressed to a locked position with pin 46 engaging shoulder 26 in transverse bore 24. Lever 16 is turned to lock the quick release mechanism to secure wheel 10 to fork 12. Advantageously, the lock assembly can remain locked without interference with bicycle operation until it is next desired to remove the wheel. It is not necessary to lock and unlock the assembly at each use of the bicycle. No modification of the bicycle is required to employ the lock assembly and the assembly is small, light and simple to manufacture.

Other embodiments of the invention will occur to those skilled in the art which are within the scope of the following claims.

What is claimed is:

1. A lock assembly for a bicycle wheel quick release mechanism having a shaft extending therethrough transversely of the wheel axle, said shaft adapted, when turned in one direction, to release the wheel for mounting or removal on the fork of a bicycle and, when turned in the other direction to secure said wheel on a bicycle wheel fork, characterized in that the lock assembly comprises:

a shaft extension adapted at one end for connection to said shaft and having a shoulder spaced from and facing said one end; and a housing adapted for connection to a bicycle wheel fork and adapted to receive said shoulder of said shaft extension, said housing comprising two parts, a first part having a bore for removeably receiving said shaft extension with said shaft extension connected to a shaft and having a lock pin mounted therein selectively moveable to engage and disengage said shoulder and having a lock connected to said lock pin adapted to lock said pin in a shoulder engaging position, and a second part adapted for connection to said first part, defining with said first part a through bore between said first and second parts for receiving said bicycle wheel fork therein.

2. The lock assembly claimed in claim 1 further characterized in that said lock and said lock pin are connected and are reciprocable together in said housing, said pin extending into said shaft extension receiving bore in one position and removed therefrom in another position.

3. The lock assembly claimed in claim 2 further characterized in that said shaft extension comprises a shaft member extending into said shaft extension receiving bore in said housing, a bore extends transversely of said shaft member for receiving said lock pin therein and said shoulder is defined by a surface of said transverse bore.

4. The lock assembly claimed in claim 3 further characterized in that said shaft extension at said one end comprises a threaded bore to receive a threaded end of said shaft for connection thereto.

5. In a bicycle having a wheel quick release mechanism for securing a wheel to a fork of the bicycle, said mechanism comprising a shaft for securing and releasing said wheel when the shaft is turned in one direction or the other, a lock assembly for said wheel characterized in that:

a shaft member extends from said shaft, said member having a transverse bore therein defining a shoulder facing said shaft; and a housing connected to said fork having a bore into which said shaft member and said shoulder removeably extend and a lock pin connected to a lock reciprocable together within said housing, said lock pin engaging said shoulder in one position and said lock adapted to lock said lock pin in said one position and said lock pin disengaged from said shoulder in another position permitting removal of said shaft member from said bore.

* * * * *